Aug. 30, 1949.  W. F. HOEFER, JR  2,480,653
FILTER
Filed Jan. 9, 1945

Inventor
William F. Hoefer Jr.

By Lyon & Lyon
Attorneys

Patented Aug. 30, 1949

2,480,653

UNITED STATES PATENT OFFICE 2,480,653

FILTER

William F. Hoefer, Jr., Altadena, Calif.

Application January 9, 1945, Serial No. 572,001

9 Claims. (Cl. 210—167)

1

This invention relates to filters and is more particularly adapted in the filtering of a liquid in a flow line to remove impurities or accumulations from such liquid.

The filter embodying my invention is particularly applicable for the filtering of lubricating oil as utilized in an internal combustion engine for lubricating the moving parts of such engine or motor although of course it is not limited to this adaptation.

It is an object of my invention to provide a filter which is adapted to be mounted in a flow line of a fluid and the filtering element of which may be cleaned without necessity of removing the filter from the line.

Another object of this invention is to provide a filter adapted to be mounted in a flow line and which utilizes as the filtering elements intertwined flat spring elements positioned so that the fluid filtered or screened passes between the leads of the spring elements.

Another object of this invention is to provide a filter incorporating intertwined flat spring elements which are adapted to be compressed to determine the width of the free passage between the leads of such springs and which spring elements are mounted in such manner as to permit their relative rotation in position for removing sediment which may collect in the filtering passes so formed between the leaves or leads of the said springs.

Another object of this invention is to provide a filter including intertwined spring elements wherein the filtering passes are provided between the passes or leads of the said springs and which springs are provided with means for determining the spacing of the springs and which means also provides means for removing from the passes foreign matter which will accumulate therein upon relative rotation of the intertwined springs.

Other objects and advantages of this invention it is believed will be apparent from the following detailed description of a preferred embodiment thereof as illustrated in the accompanying drawings.

Figure 1:
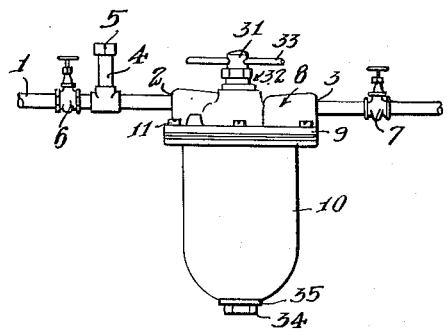
Figure 1 is a diagrammatic illustration of the filter embodying my invention illustrating the same as positioned within a flow line.
Figure 3:
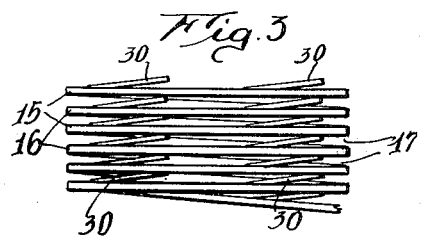
Figure 3 is a fragmental elevation on an enlarged scale illustrating the construction of the spring elements incorporated in the filter embodying my invention.
Figure 2:
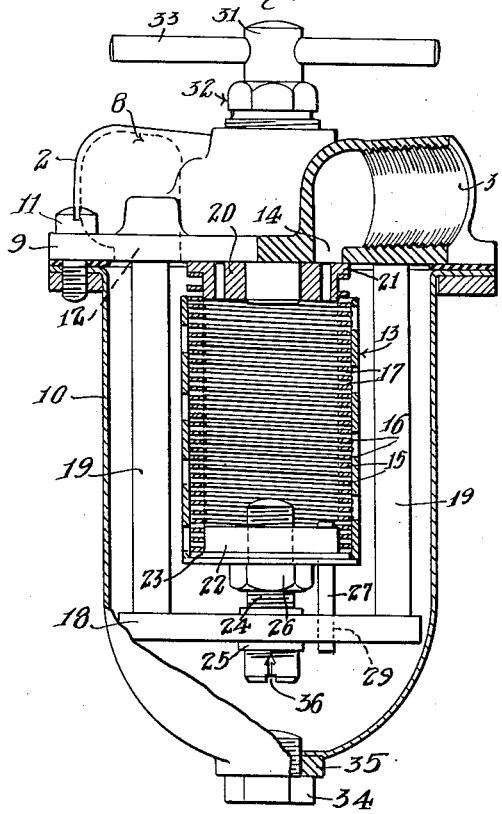
Figure 2 is a sectional elevation thereof.

2 scale of the spring elements as illustrated in Figure 3.

In the preferred embodiment of my invention as illustrated in the accompanying drawings, the filter embodying my invention is adapted to be mounted in a flow line which may be a lubrication flow line of an internal combustion engine. This flow line is indicated at 1 and is connected with the inlet 2 of the filter and with the outlet 3 thereof. Mounted in the flow line 1 is a branch lead 4 which is normally plugged as indicated at 5. Mounted in the flow line before the branch lead 4 is a valve 6, while mounted in the flow line 1 beyond the filter outlet is a valve 7.

The filter embodying my invention preferably includes a head element 8 which is formed with the inlet branch 2 and the outlet branch 3 and a supporting plate 9 to which a sump bowl 10 is secured by means of suitable screw elements 11.

Formed through the plate 9 in communication with the inlet branch 2 is an inlet port 12 which extends into the sump bowl 10 exterior to a filter cylinder 13. Likewise formed through the plate 9 is an outlet port 14 which leads into the interior of the filter cylinder 13 and communicates with the outlet branch 3.

The filtering element embodying my invention is preferably of the following construction and includes the perforated filter retaining cylinder 13 within which there is positioned two helical flat springs 15 and 16 which are intertwined so that the flat leads of each spring lie between leads of the opposite spring. The spacing between the flat leads of the two springs determines the filtering pass 17 through which fluid to be filtered passes in flowing from the inlet branch 2 through the bowl 10, the pass 17, and out through the port 14 through the discharge branch 3.

Means are provided for adjusting the width of the filtering pass 17 which preferably comprises means for determining the degree of compression under which the two springs 15 and 16 are subjected within the filtering cylinder 13 and as herein illustrated, includes a compression bar 18 secured to posts 19 depending from the plate 9 and a spring stop collar 20 having an engaging flange 21 against which the upper ends of the springs are seated below the plate 9. Mounted within the filter cylinder 13 is a similar stop collar 22 having an end flange 23 against which the lower ends of the springs are seated. The last few turns of the upper end of spring 16 are secured to the rotatable collar 20. Similarly, the last few turns of the lower end of spring 15 are secured to the non-rotatable collar 22.

Means are provided for determining the spacing between the leads of the spring and therefore the width of the filter channels 17, which means may be of the following construction: Mounted within the bar 18 is a nut 25 through which a screw 24 is threaded and the screw 24 extends through a bore formed in the collar 22. A stopnut 26 is threaded to the screw to determine the initial compression of the springs 15 and 16. Means are also secured to the collar 22 for holding the collar from rotation, which means as herein illustrated includes a pin 27 which is secured to the collar 22 and extends through the bottom plate of the cylinder screen 13 and passes through a guide bore 29 formed in the bar 18. It will thus be seen that one spring 15 is secured to and stopped against one collar 22 while the other spring 16 is secured to and stopped against the upper collar 20.

Figure 4:
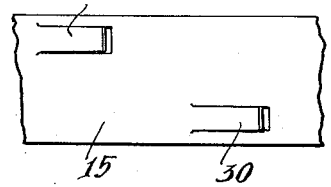
Figure 4 is a fragmental plan on an enlarged

Means are provided for effecting relative rotation of the springs 15 and 16 while they are positioned within the bowl 10 so that any sediment which settles within the filtering passes 17 may be dislodged and separated into the bottom of the bowl 10 and this means preferably comprises the following:

In order to maintain the leads of the springs definitely spaced, the springs are formed as illustrated on an enlarged scale in Figures 3 and 4 wherein the metal bands of which the springs are formed are stamped to provide spacer elements 30 which are forced out from the surface of the said metal bands so that when the springs are wound and intermeshed as illustrated in Figure 3, the spacer elements maintain the leads of the springs 15 and 16 in definite spaced relation. As these spacer elements 30 are formed of the same spring steel of which the springs are formed, the compression of the two springs will act to force the spacer elements back into the spaces from which they are cut, whereby determining the spacing between the leads in accordance with the compression of the two intermeshing springs.

Secured to the upper collar 20 is a rotation pin 31 which extends through a packing gland element 32 carried by the cap 8 and carrying a rotation cross rod 33 exterior of the filter. Thus by rotation of the pin 31 one of the spring elements is rotated with reference to the other causing the spacing elements 30 to have relative movement along the space of the springs, dislodging any accumulated matter which may accumulate within the filter passes 17. In order to flush out such foreign matter, it may be advisable to close the valves 6 and 7 and flush a cleansing fluid through the filter by removing the plug 5 and causing the flushing fluid to be passed through the branch 4 and into the inlet 2. This flushing fluid may be then caused to pass through the filter passes 17 and to flush the accumulated material into the filter bowl 10 where it may be removed by removing the bottom plug 34 which is threaded in the bottom plug flange 35 of the bowl 10. By rotating the pin 31 back and forth all foreign matter which has accumulated in the filter may then be removed and will be flushed out through the perforated cylinder 13 and will pass out of the bowl through the opening provided by removal of the plug 34. The plug 34 may be then replaced and the two valves 6 and 7 opened and the cap 5 replaced and the filtering operation may be then resumed to filter the lubricating oil or other liquid or fluid.

It will be apparent from the foregoing that if it appears during operation that the filter is not operating effectively to filter the fluid passed therethrough, that the filtering passes 17 provided between the adjacent runs of the springs may be varied by removing the plug 34 and rotating the screw 24 to change the compression at which the springs are operating. In order to permit this operation, the end of the screw 24 may be formed with a screw-driver groove 36 permitting the screw to be turned by inserting a screw-driver through the opening provided on removal of the plug 34.

Having fully described my invention, it is to be understood that I do not wish to be limited to the details herein set forth, but my invention is of the full scope of the appended claims.

I claim:

1. A filtering strainer including a filtering or straining element composed of a pair of intertwined helical spring elements where the leads of one spring element lie between the leads of the other spring element, the adjacent leads of the respective spring elements defining clearance spaces therebetween for passage of fluid, and means for turning one of the spring elements relative to the other.

2. In a filter device, the combination of a filtering element including a pair of helical springs which are intertwined so that the leads of one spring lie between the leads of the other spring, said spring elements having spacer elements which are positioned between the said alternating leads, and means for turning one of the spring elements relative to the other.

3. In a filter device, the combination of a container having an inlet and an outlet, a perforated filtering cylinder mounted within the container in the path of fluid flowing from the inlet to the outlet, filtering means positioned within the filtering cylinder comprising a pair of helical springs having leads successively intertwined, means for turning one of the helical springs relative to the other, and means positioned between the leads of the springs for maintaining the said leads in definite spaced relation.

4. In a filter device, the combination of a container having an inlet and an outlet, a perforated filtering cylinder mounted within the container in the path of fluid flowing from the inlet to the outlet, filtering means positioned within the filtering cylinder comprising a pair of helical springs having leads successively intertwined, means positioned between the leads of the springs for maintaining the said leads in spaced relation, means for turning one of the helical springs relative to the other, and means for axially compressing the springs to vary the width of spacing between said leads.

5. In a filtering device, a filtering element consisting of a pair of helical springs having flat surface leads, said springs being intertwined to position the leads of one spring between the leads of the other spring, means for turning one spring relative to the other, and resilient means interposed between the said leads for maintaining the said leads in spaced relation.

6. In a filtering device, a filtering element comprising a pair of flat helical wound spring elements which are intertwined to position the leads of the springs in alternate relation, means for turning one spring relative to the other, the leads of the spring elements having resilient spacing elements integral therewith whereby the springs are maintained in spaced relationship to determine filtering paths between the said flat leads.

7. In a filtering device, a filtering element comprising a pair of flat helical wound spring elements which are intertwined to position the leads of the springs in alternate relation, means for turning one of the spring elements relative to the other, the leads of the spring having spacing elements integral therewith whereby the springs are maintained in spaced relationship to determine filtering paths between the said flat leads, means to compress the springs axially the spacing means carried by the flat elements of the springs being of a yieldable character whereby upon compression of the springs said spacing elements yield to permit said leads to move toward each other.

8. In a filter, the combination of a pair of axially spaced members, a pair of intertwined helical springs positioned between said members and providing clearance spaces between adjacent leads for passage of fluid, one of the springs being secured relative to one of said members and the other spring being secured relative to the other member, means for turning one of the members, and means resisting rotation of the other member.

9. In a filter, the combination of a pair of axially spaced members each having a cylindrical portion and a flange, means for turning one of the members and providing clearance spaces between adjacent leads for passage of fluid, means for resisting rotation of the other member, a pair of intertwined helical springs confined under compression between said flanges and encircling the cylindrical portions on said members, one of the springs being secured relative to one of the members and the other spring being secured relative to the other member.

WILLIAM F. HOEFER, JR.

REFERENCES CITED

The following references are of record in the file of this patent:

UNITED STATES PATENTS

| Number | Name | Date |
| --- | --- | --- |
| 408,487 | Jewell | Aug. 6, 1889 |
| 2,100,266 | Perry | Nov. 23, 1937 |
| 2,197,971 | Elze et al. | Apr. 23, 1940 |
| 2,301,430 | Malanowski | Nov. 10, 1942 |
| 2,308,865 | Davis | Jan. 19, 1943 |
| 2,342,669 | Hoffman | Feb. 29, 1944 |

FOREIGN PATENTS

| Number | Country | Date |
| --- | --- | --- |
| 527,259 | Great Britain | Oct. 4, 1940 |